Nov. 15, 1960

L. R. BERGSTRÖM 2,960,630

ARRANGEMENT FOR HIGH SPEED RECLOSING
OF ELECTRICAL POWER LINES

Filed April 5, 1957

INVENTOR.
Lars R. Bergström
BY
Attorney.

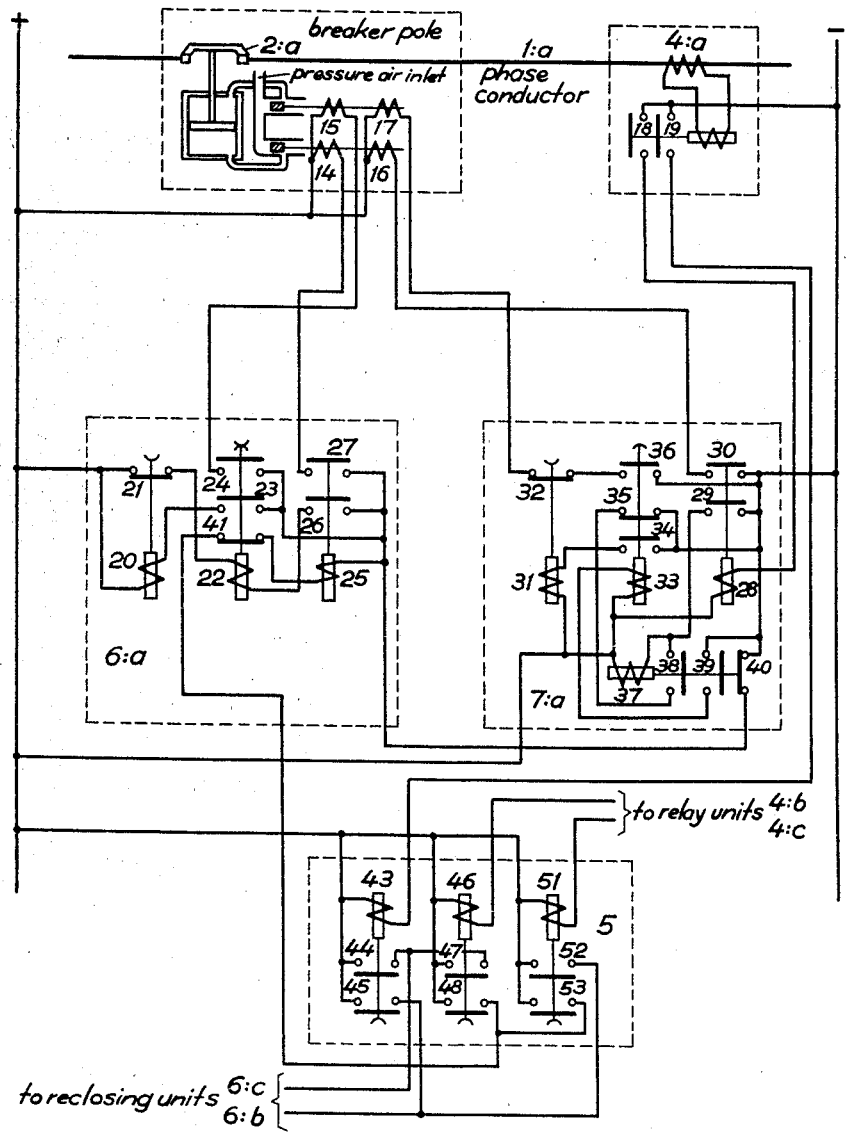

United States Patent Office 2,960,630
Patented Nov. 15, 1960

2,960,630

ARRANGEMENT FOR HIGH SPEED RECLOSING OF ELECTRICAL POWER LINES

Lars R. Bergström, Ludvika, Sweden, assignor to Allmanna Svenska Elektriska Aktiebolaget, Vasteras, Sweden, a corporation of Sweden Filed Apr. 5, 1957, Ser. No. 650,988

Claims priority, application Sweden May 9, 1953

2 Claims. (Cl. 317—25)

This invention relates to an arrangement for high speed reclosing of electrical power lines and is a continuation-in-part of my patent application Serial No. 425,976, filed on April 27, 1954, and now abandoned.

For protection of electrical power lines against short circuits control arrangements have for a long time been used, which quickly operate circuit breakers belonging to the phase conductors exposed to the short circuit and rapidly reclose them. Further, in order to maintain the stability in the power system, arrangements have been used for clearing single-phase faults, which arrangements only disconnect the faulty phase during a short period, while the sound phase conductors remain closed and thus contribute to maintaining the synchronism in the power system. A difficulty however, of this single-phase reclosing method is, that the extinguishing of the arc on the faulty phase is aggravated by the current, which by influence or induction is transmitted from the sound phase conductors. When the length of the power line at a certain service voltage exceeds a certain value, the arc on the faulty phase is maintained, even if this phase would transiently be earthed.

The object of the invention is to ascertain that the arc at the fault point is extinguished and does not restrike without, on the other hand, substantially increasing the risk of the network getting out of step. According to the invention, this is obtained by means of an arrangement which controls the breakers at the end points of the line in such a way that at first all the phase conductors of the line are disconnected, then the sound ones are rapidly reclosed, finally, the faulty phase conductor is reclosed after a period which is necessary for restoring its dielectric strength. In this process the sound phase conductors are reclosed at a time, when the arc on the faulty phase may be expected to be extinguished, but before the deionising of the arc path has advanced to the extent that the faulty phase conductor, by reclosing, may be exposed to the full phase voltage. Other objects and features of the invention will appear more fully and clearly from the following description in connection with the appended drawings in which:

Figure 4 shows in more detail, the control device for one of the breakers.

Figure 1:
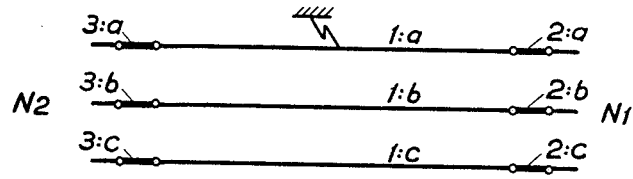
Figure 1 shows schematically a three phase high voltage line.

In Figure 1 the three phase conductors of a three phase power line are indicated by $1:a$, $1:b$, and $1:c$. The power line transmits electrical power between the sections $N_1$ and $N_2$ of the network. The power line 1 is connected to the network section $N_1$ by the three breaker poles, $2:a$, $2:b$, and $2:c$ and to the network section $N_2$ by the breaker poles $3:a$, $3:b$, and $3:c$. The breaker poles $2:a$, $2:b$, $2:c$ and $3:a$, $3:b$, $3:c$ respectively are operated separately for each phase, by means of the operating devices shown in Figures 3 and 4.

Figure 2:
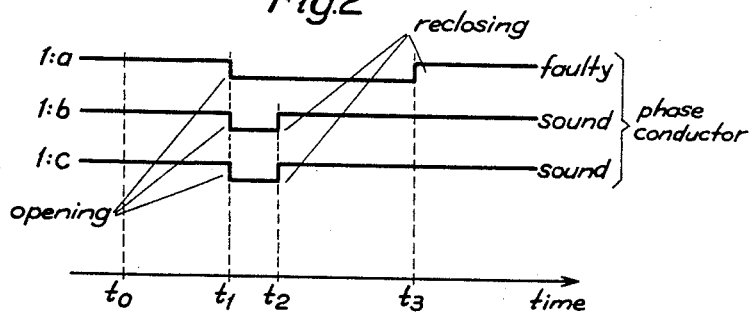
Figure 2 shows a time diagram for the reclosing process.

The time diagram in Figure 2 shows the sequence of the opening and reclosing operations. It is supposed that a fault occurs on the phase conductor $1:a$ at the time $t_0$. The breaker poles 2 and/or 3 will then be opened for all three phase conductors at the time $t_1$, by means of an apparatus sensitive to the fault on the power line. Thus, the three phase conductors $1:a$, $1:b$, and $1:c$ will be disconnected from the sections $N_1$ and $N_2$ of the network. After a time, which is sufficient for the extinguishing of the arc on the faulty phase, the breaker poles $2:b$ and/or $3:b$, as well as $2:c$ and/or $3:c$ on the sound phase conductors, are reclosed at the time $t_2$. At that time, it is true, these sound phases begin to induce voltages in the formerly faulty phase by capacitive or inductive coupling. These voltages, however, only amount to a part of the full phase voltage, the risk that the fault arc restrikes being substantially reduced or completely eliminated. Thus, power can be transmitted over the sound phases now reconnected and the synchronism is maintained in the network. Following the reconnection of phase conductors $1:b$ and $1:c$ the dielectric strength of the formerly faulty phase $1:a$ will be further increased and can, after a certain time, be supposed to have obtained its full value. At the time $t_3$ the breaking poles $2:a$ and/or $3:a$ are reclosed, and thus this phase conductor is also exposed to the full voltage and will participate in power transmission.

Figure 3:
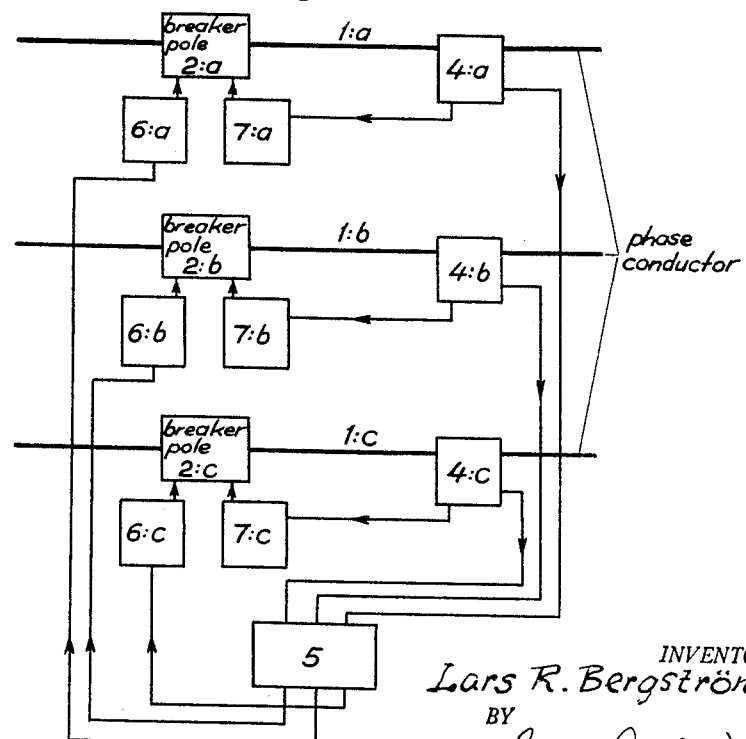
Figure 3 shows a block diagram giving a survey of the control devices for the breakers in the three phase conductors.

The block diagram according to Figure 3 gives a survey of the control equipment belonging to the three breaker poles $2:a$, $2:b$ and $2:c$. The apparatus $4:a$, $4:b$ and $4:c$, responsive to the current and/or voltage in the phase conductors $1:a$, $1:b$ and $1:c$ respectively, affects on the one side, the individual relay units $7:a$, $7:b$ and $7:c$ respectively for high speed reclosing a faulty phase, on the other side the phase selector apparatus 5, common to all the three phases. That of the relay units 7 which belongs to the faulty phase, e.g. the phase $1:a$, causes the reclosing of the corresponding breaker pole $2:a$. The phase selector 5 affects the reclosing units $6:b$ and $6:c$, thereby initiating the reclosing of the breaker poles in the sound phases $1:b$ and $1:c$.

The control equipment for one of the breaker poles, $2:a$ is shown in detail in Figure 4. The same equipment, comprising the breaker pole 2, the apparatus 4, the reclosing unit 6 and the relay unit 7 has to be individually arranged for each of the breaker poles, whilst the phase selector 5 is common to all the three breaker poles. The apparatus $4:a$ sensitive to the fault on the faulty phase conductor $1:a$, is equipped with the contacts 18 and 19. On the occasion of a fault in the conductor $1:a$, these contacts close. Through the contact 18, the relay 28 in the relay unit $7:a$ is energised and its contacts 29 and 30 will close. The contact 30 affects the tripping magnet 16 of the breaker pole $2:a$ and this pole opens. Simultaneously, a relay 37 in the relay unit $7:a$ is energised by the contact 29. The relay 37 holds itself through its contact 38 and the contact 35 of the relay 33. The relay 33 picks-up after a certain adjustable time lag and initiates through its contact 36, the closing magnet 17 of the breaker pole $2:a$, to function, thereby causing the breaker pole to reclose. At the same time relay 37 is de-energised and the time lag relay 31 is energised. If the fault on the phase conductor is not eliminated the same process will be repeated. The closing magnet 17, however, will not be energised because the relay 31 holds itself in the on-position for a certain time and its contact 32 remains open. The breaker pole $2:a$ is then finally opened.

When the apparatus $4:a$ works the first time, its contact 19 closes and actuates the relay 43 in the phase selector 5. Re-setting of the relays 43, 46 and 51 is delayed. An impulse is given through the contacts 44 and 45 to the reclosing units 6:c and 6:b belonging to the sound phases. These reclosing units are identical to the unit 6:a and therefore the process is described as for 6:a when the unit 6:a is affected by the phase selector 5. The relay 25 in the reclosing unit 6, then picks-up, closing its contact 27 and thereby affecting the tripping magnet 14 of the breaker pole 2. The breaker pole then opens. Simultaneously the relay 22, in the reclosing unit 6, is energised through contact 26 of the relay 25. Relay 22 is delayed for both operating and re-setting, the operation time lag having such an amount that the tripping magnet 14 can function before the closing magnet 15 is energised. This time lag also determines the time interval during which the breaker pole is open. By picking up, the relay 22 also resets the relay 25 by means of its contact 41. The resetting time of the phase selector relays is adjusted to give a resetting prior to that of relay 22. The breaker pole is therefore prevented from opening a second time. The time lag of relay 22 safeguards that the closing impulse for the closing magnet 15 is entirely transmitted by contact 24. If, after the high-speed reclosing of the faulty phase a new impulse reaches the reclosing unit 6, i.e. if the reclosing is unsuccessful, the breaker pole will be finally opened. The reason is that relay 22 cannot pick-up as contact 21 of the relay 20 is open. Relay 20 had been energised through contact 23 of the time lag relay 22.

If a fault occurs in two or more phase conductors simultaneously, a normal high-speed reclosing will take place in all the faulty phases. The reason is that the relays 37 in the relay unit 7, belonging to the faulty phase, through contacts 40 break the circuits of the reclosing units 6. The contacts 40 are open during the whole of the time that the breaker poles in the faulty phases are open.

According to the above description the disconnecting of all the phase conductors by means of the breaking poles 2:a, 2:b, 2:c and/or 3:a, 3:b, 3:c is carried out simultaneously, immediately after the fault has occurred. The disconnecting of these breaking poles however, may also take place in two steps, the faulty phase conductor being disconnected first. The remaining two phases, it is true, then feed the arc at the fault point by capacitive or inductive coupling and on long, large, power lines, the arc at the fault point remains. The arc is then, however, fed by a comparatively small current which later facilitates the deionising of the fault location. Then the two sound phase conductors are disconnected and the arc will extinguish. In conformity with the above description the sound phase conductors are now rapidly reclosed, whilst the breaking poles 2:a and/or 3:a, belonging to the formerly faulty phase conductor, will be reclosed somewhat later. By doing so, ample time is obtained for the deionisation of the fault point, the synchronising force between the two parts of the network at the same time being quickly restored.

Although the object of the invention, in the first place, is to eliminate single-phase arc faults, it can also be applied to faults on more than one-phase conductor, the sound phase conductor or the sound phase conductors, in this case, also being reclosed before the faulty ones.

I claim as my invention:

1. In an electrical power system including a high voltage line with at least three phase conductors and having circuit breaker means at one end of said line for connecting said phase conductors to other sections of the system, a device for eliminating a fault on one of said phase conductors by opening and rapidly reclosing said breaker means, said device comprising means for automatically and simultaneously disconnecting all said phase conductors upon occurrence of a fault on one of said phase conductors, automatically reclosing the phase conductors not exposed to said fault after a time interval necessary for extinguishing a fault arc at the point of said fault and automatically reclosing the phase conductor exposed to said fault after a time interval necessary for restoring its dielectric strength reduced by the ionization of the air caused by said fault arc, said last mentioned time interval being considerably longer than said first mentioned time interval.

2. A device according to claim 1, said device comprising first means, responsive to the fault occurring on said line for initiating the opening of said circuit breaker means in all of said phase conductors, second means controlled by and operative after the operation of said first means for reclosing the circuit breaker means in the sound phase conductors at a predetermined time interval, and third means controlled by said first means and operative after the operation of said first and second means for reclosing the circuit breaker means at a predetermined time interval in the faulty phase conductor.

References Cited in the file of this patent

UNITED STATES PATENTS

| | | |
|---|---|---|
| 2,462,179 | Goldsborough | Feb. 22, 1949 |
| 2,539,416 | Goldsborough | Jan. 30, 1951 |
| 2,567,411 | Van Ryan | Sept. 11, 1951 |

OTHER REFERENCES

Electrical Engineering, May, 1947, pp. 467–470, "Single Pole Relaying and Reclosing on a High-Voltage System."